(12) United States Patent
Krumbholz et al.

(10) Patent No.: US 6,234,464 B1
(45) Date of Patent: May 22, 2001

(54) MICROENCAPSULATED UNSATURATED FATTY ACID OR FATTY ACID COMPOUND OR MIXTURE OF FATTY ACIDS AND/FATTY ACID COMPOUNDS

(75) Inventors: Rudolf Krumbholz, Holving (FR); Alf Lamprecht; Claus-Michael Lehr, both of Saarbrücken (DE); Ulrich Schäfer, Sulzbach (DE); Norbert Schirra, Völklingen (DE); Manfred Treitz, Grossrosseln (DE)

(73) Assignee: K.D. Pharma Bexbech GmbH, Bexbach (DE)

( * ) Notice: Subject to any disclaimer, the term of this patent is extended or adjusted under 35 U.S.C. 154(b) by 0 days.

(21) Appl. No.: 09/348,379

(22) Filed: Jul. 7, 1999

(30) Foreign Application Priority Data

Jul. 8, 1998 (DE) .............................................. 198 30 375

(51) Int. Cl.⁷ ............................. B01J 13/02; B01J 13/04; B05D 7/00
(52) U.S. Cl. ................ 269/4.32; 427/213.3; 427/213.35; 428/402.2
(58) Field of Search .................................... 264/4.1, 4.32; 427/213.3, 213.35, 214; 428/402.2

(56) References Cited

U.S. PATENT DOCUMENTS 5,456,985 * 10/1995 Zgoulli et al. .................... 428/402.2
5,716,637 * 2/1998 Anselem et al. ..................... 424/450
5,853,761  12/1998 Kumabe et al. .

FOREIGN PATENT DOCUMENTS

| 2037947 | 4/1971  | (DE) . |
| 0338499 | 10/1989 | (EP) . |
| 0627173 | 12/1994 | (EP) . |
| 2758055 | 7/1998  | (FR) . |
| 9221251 | 12/1992 | (WO) . |
| 9700623 | 1/1997  | (WO) . |
| 9818346 | 5/1998  | (WO) . |

* cited by examiner

*Primary Examiner*—Nathan M. Nutter
(74) *Attorney, Agent, or Firm*—Friedrich Kueffner

(57) ABSTRACT

A microencapsulated unsaturated fatty acid or fatty acid compound or mixture of fatty acids and/or fatty acid compounds, and particularly an omega-3-fatty acid or omega-6-fatty acid or an ethyl ester or a glyceride thereof or a mixture of such fatty acids and/or fatty acid compounds. Fatty acid compounds are understood to include derivatives. Particles of the compounds are provided with capsule walls composed of two layers. The inner layer is composed of gelatin A, gelatine B. casein or an alginate, or of a derivative or salt of one of these polymers. The outer layer is composed of gelatin B, gum arabic, pectin or chitosan or a derivative or salt of one of these polymers.

21 Claims, No Drawings

MICROENCAPSULATED UNSATURATED FATTY ACID OR FATTY ACID COMPOUND OR MIXTURE OF FATTY ACIDS AND/FATTY ACID COMPOUNDS

BACKGROUND OF THE INVENTION

1. Field of the Invention

The present invention relates to a microencapsulated unsaturated fatty acid or fatty acid compound or mixture of fatty acids and/or fatty acid compounds. In particular, the invention relates to an omega-3-fatty acid or omega-6-fatty acid or an ethyl ester or a glyceride thereof or a mixture of such fatty acids and/or fatty acid compounds. Fatty acid compounds are understood to include derivatives.

2. Description of the Related Art

Such microencapsulated fatty acid products are in demand as supplements to be added to foods. The encapsulation protects the fatty acid products against oxidation and prevents the development of odor.

For example, U.S. Pat. No. 3,041,288 discloses an encapsulation with bone gelatin and EP-A-0 336 622 discloses an encapsulation with another polymer.

These encapsulations disclosed in the-prior art are unsatisfactory in particular with respect to their storage stability and temperature stability.

SUMMARY OF THE INVENTION

Therefore, it is the primary object of the present invention to provide a more stable product of the above-mentioned type.

In accordance with the present invention, this object is met by providing a capsule wall composed of two layers.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

DESCRIPTION OF THE PREFERRED EMBODIMENTS

In accordance with a further advantageous development of the invention, the inner layer is composed of bone gelatin (gelatin A or gelatin B), casein or an alginate or by a derivative or salt of one of these polymers, and the outer layer is composed of gelatin B, gum arabic, pectin or chitosan or a derivative or salt of one of these polymers.

Proposed in particular are the combinations gelatin A/gum arabic, gelatin B/gum arabic, casein/gum arabic, gelatin A/pectin, gelatin A/gelatin B and alkali metal alginate/chitosan as well as derivatives and salts of these polymers.

For manufacturing a microencapsulated unsaturated fatty acid or fatty acid compound, particularly an omega-3-fatty acid or omega-6-fatty acid or an ethyl ester or glyceride thereof, or a microencapsulated mixture particularly of the above fatty acids and/or fatty acid compounds, the method according to the present invention provides generally, and particularly for forming a capsule wall of the above polymers, that the fatty acid or fatty acid compound or mixture is dispersed in water and two layers each formed by a polymer are successively deposited on the particles of the dispersion from the colloidal solution of the polymer. Preferably, the inner layer is caused to be deposited by the particles by interfacial forces and/or the outer layer is caused to be deposited by electrostatic forces.

The polymer forming the inner layer is preferably selected in such a way that it acts as a protective colloid which stabilizes the dispersion during the further manufacturing process. In this connection, it is useful if the fatty acid or fatty acid compound or mixture is emulsified in a previously prepared colloidal solution of the polymer forming the inner layer.

The outer layer is preferably applied in such a way that, after depositing the inner layer, a colloidal solution of the polymer forming the outer layer is added and the polymer is caused to be deposited on the first layer.

For depositing the outer layer, a particularly advantageous further development of the process proposes that by changing the pH value of the dispersion the charge of the polymer forming the inner layer and/or the charge of the polymer forming the outer layer are changed so as to produce a difference between the charges of the two polymers. As a rule, the pH value will be lowered, preferably to 3.5 to 5.5, for producing a positive charge of the polymer forming the inner layer.

By subsequently lowering the temperature, the formation of the two layers can be reinforced by the formation of gel. Subsequently, water can be removed from the two gel layers by drying and, thus, solidification can be obtained.

In accordance with a useful feature, the particles will be allowed to settle prior to drying and the liquid above the particles will be poured off.

In accordance with an advantageous further development of the method, drying is effected by suspending the particles in a liquid which attracts water, preferably ethanol.

Since ethanol dissolves many unsaturated fatty acids, ethanol additionally removes any quantities which have not been encapsulated. In the case of fish oils, this removes the unpleasant fish odor which otherwise occurs on the surface of the microcapsule.

After drying, the particles can be filtered and essentially completely dried. This results in a flowable product.

The product is stable in boiling water. This makes it possible to use the product in new fields of application. The use of the product is also possible for supplements in foods which are subjected to higher temperatures, such as prepared flours for baked products, prepared baking mixtures or freeze-dried prepared soups. Use of the product in yoghurt, ice cream, muslin, beverages, etc., is also possible.

The greater stability of the capsules makes them particularly suitable for multiple unsaturated fatty acids which are in particular danger of oxidation, for example, eicosapentaenoic acid.

In the following, the invention will be explained in further detail with the aid of examples.

EXAMPLE 1

A 95% eicosapentaenoic acid ethyl ester is added to a 2.5% solution of gelatin A (bone gelatin) in water and is dispersed at 50° C. for 20 minutes with a high speed agitator or by means of ultrasound. This results in a stable emulsion of relatively high homogeneity of the particles. The gelatin A acts as a protective colloid. The gelatin A simultaneously forms a first layer for encapsulation. A 2.5% aqueous solution of gum arabic is added to the emulsion. After adding additional water and adjusting the aqueous phase to a weakly acidic pH value, i.e., from previously about 7 to 7.5 to about 4.25 to 4.5, cooling to room temperature is carried out during normal agitation. During this treatment, a second layer which is initially still loose and voluminous is deposited on the particles. This is followed by further cooling to about 5° C. by means of an ice bath.

The particles with the two encapsulation layers which now have the form of firmer gels as a result of cooling are allowed to settle and are separated from the liquid above the particles by decanting. Subsequently, the particles are suspended in ethanol and are later filtered and dried in air.

Ethanol removes water from both gel layers and solidifies the layers to such an extent that the filtration is possible. During drying in air, the residues of the ethanol evaporate; the encapsulation layers reach their final solid state after being dried in air. The microcapsules have a size of between 30 and 70 µm and they have a smooth surface. They form a flowable powder.

The processes are generally carried out in inert gas in order to prevent an oxidation of the eicosapentaenoic acid ethyl ester during the manufacture of the product.

EXAMPLES 2, 3 and 4

The method described in example 1 is applied to the polymer combinations gelatin B/gum arabic, casein/gum arabic and gelatin A/pectin, respectively.

The obtained microcapsules have about the same properties as those obtained in accordance with example 1.

EXAMPLE 5

The method described in example 1 is applied to the polymer combination gelatin A/gelatin B with the modification that the pH value adjusted for triggering the second deposit was 5.5.

The obtained microcapsules again had approximately the same properties as those obtained in accordance with example 1.

While specific embodiments of the invention have been described in detail to illustrate the inventive principles, it will be understood that the invention may be embodied otherwise without departing from such principles.

We claim:

1. A microencapsulated unsaturated fatty acid or fatty acid compound, or a mixture of the fatty acids and/or fatty acid compounds, wherein particles of the fatty acid or fatty acid compound or mixture thereof each have a capsule wall, wherein the capsule wall is comprised of two layers, wherein the inner layer is comprised of gelatin A, gelatin B, casein or an alginate, or of a derivative or salt of one of these polymers.

2. The microencapsulated fatty acid or fatty acid compound or mixture thereof according to claim 1, wherein the outer layer is comprised of gelatin B, gum arabic, pectin or chitosan or a derivative or salt of one of these polymers.

3. The microencapsulated fatty acid or fatty acid compound or mixture thereof according to claim 1, wherein the capsule wall has an inner layer and an outer layer, and wherein the inner and outer layers are comprised of a combination selected from the group consisting of gelatin A and gum arabic, gelatin B and gum arabic, casein and gum arabic, gelatin A and pectin, gelatin A and gelatin B, and alkali metal alginate and chitosan or derivatives or salts of these polymers.

4. A method of manufacturing a microencapsulated unsaturated fatty acid or fatty acid compound, or a microencapsulated mixture of the fatty acids and/or fatty acid compounds, the method comprising dispersing the fatty acid or fatty acid compound or mixture thereof in the form of particles in water, and forming a capsule wall on each particle by successively depositing on the particles of the dispersion an inner layer and an outer layer each formed by a polymer from a colloidal solution of the polymer in the water.

5. The method according to claim 4, wherein the inner layer is deposited on the particles by interfacial forces.

6. The method according to claim 4, wherein the outer layer is deposited on the particles by electrostatic forces.

7. The method according to claim 4, wherein the polymer forming the inner layer acts as a protective colloid.

8. The method according to claim 7, comprising emulsifying the fatty acid or fatty acid compound or mixture thereof in a previously prepared colloidal solution of the polymer forming the inner layer.

9. The method according to claim 4, comprising, after depositing the inner layer, adding a colloidal solution of the polymer forming the outer layer and depositing the polymer on the inner layer.

10. The method according to claim 4, comprising depositing the polymer forming the outer layer by changing the pH value of the dispersion in order to change at least one of the charges of the polymer forming the inner layer and the charge of the polymer forming the outer layer and to produce a difference between the charges of the two polymers.

11. The method according to claim 10, comprising lowering the pH value for producing a positive charge of the polymer forming the inner layer.

12. The method according to claim 11, comprising lowering the pH value to 4.5 to 5.5.

13. The method according to claim 4, comprising lowering the temperature of the dispersion after depositing the outer layer.

14. The method according to-claim 4, comprising drying at least the outer layer after the outer layer has been deposited.

15. The method according to claim 14, wherein the outer layer is dried after lowering the temperature of the dispersion.

16. The method according to claim 14, wherein the outer layer is dried after settling of the particles and decanting liquid above the particles.

17. The method according to claim 14, comprising drying the outer layer by suspending the particles in a liquid which attracts water.

18. The method according to claim 17, wherein the liquid is ethanol.

19. The method according to claim 14, comprising filtering the particles after drying and substantially completely drying the particles.

20. The microencapsulated fatty acid or fatty acid compound or mixture thereof according to claim 1, wherein the compound comprises omega-3-fatty acid or omega-6-fatty acid or ethyl ester or glyceride thereof.

21. The method according to claim 4, wherein the compound comprises omega-3-fatty acid or omega-6-fatty acid or ethyl ester or glyceride thereof.

* * * * *